Feb. 6, 1934. C. FIELDS 1,945,888
CAP FEEDING MECHANISM
Filed May 11, 1931 4 Sheets-Sheet 1

Inventor
Cecil Fields

Eccleston & Eccleston
Attorneys

Feb. 6, 1934.  C. FIELDS  1,945,888

CAP FEEDING MECHANISM

Filed May 11, 1931  4 Sheets-Sheet 2

Inventor
Cecil Fields

By Eccleston & Eccleston
Attorneys

Feb. 6, 1934.                     C. FIELDS                      1,945,888
                          CAP FEEDING MECHANISM
                    Filed May 11, 1931          4 Sheets-Sheet 4

Inventor
Cecil Fields
By
Eccleston + Eccleston
Attorneys

Patented Feb. 6, 1934

1,945,888

UNITED STATES PATENT OFFICE 1,945,888

CAP FEEDING MECHANISM

Cecil Fields, Wheeling, W. Va., assignor to Hazel-Atlas Glass Co., Wheeling, W. Va., a corporation of West Virginia Application May 11, 1931. Serial No. 536,607

21 Claims. (Cl. 198—33)

The invention relates generally to improved mechanism for the manufacture of caps, and one of the objects of the invention is to provide a mechanism which will automatically arrange all caps in mouth-down position, or all caps in mouth-up position, as desired, for the next operation.

Another object of the invention is to provide an improved device for properly spacing and arranging the caps before they reach the turn-over mechanism.

Other objects and advantages of the invention will be apparent to those skilled in the art, from the following detailed description, when taken in connection with the accompanying drawings, in which.

Figure 1:
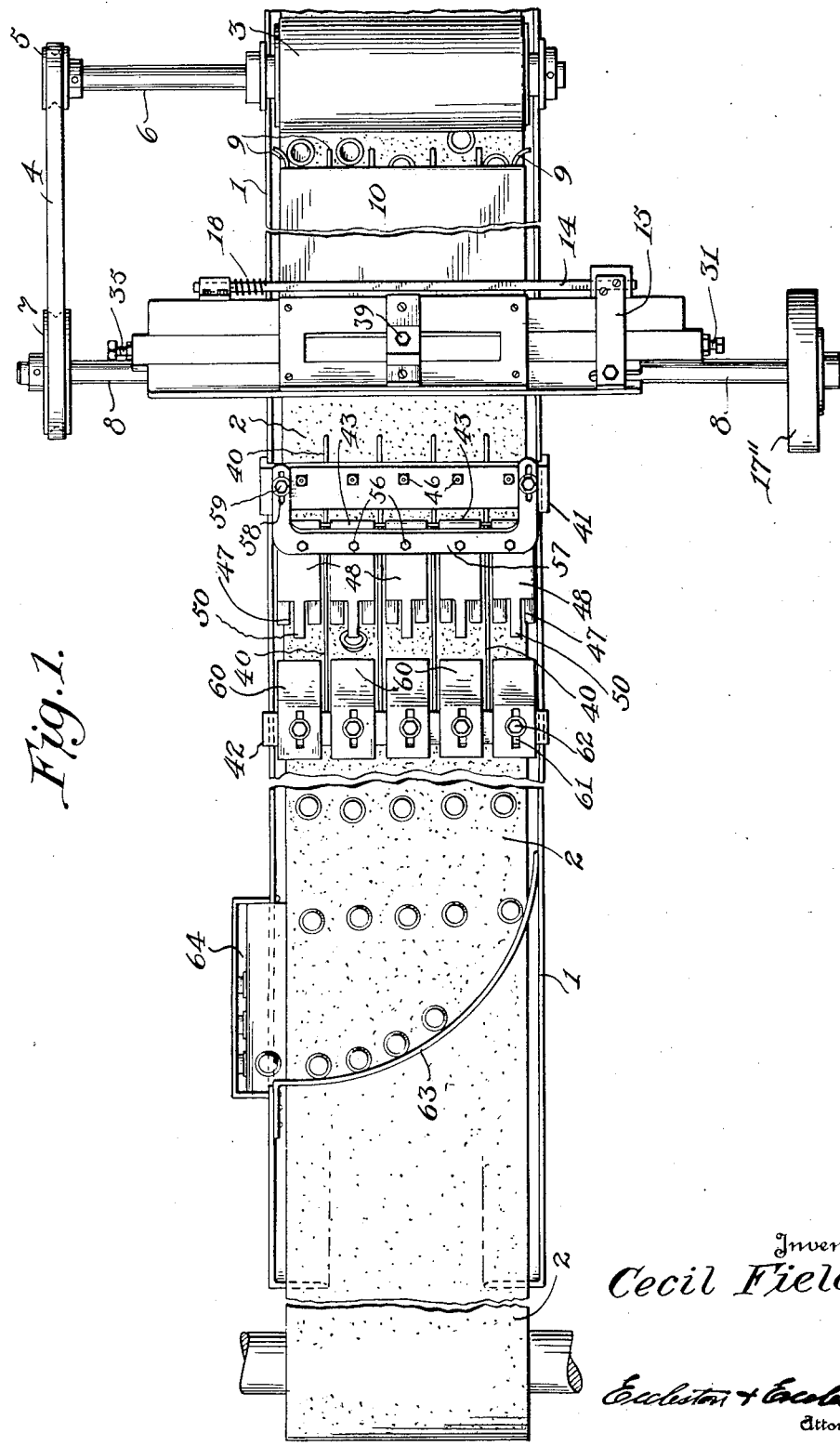
Figure 1 is a plan view of the mechanism; many details of construction having been omitted for the sake of clearness.

Throughout the drawings details of construction have been omitted whenever it was possible to do so without interfering with a complete disclosure of the construction and operation of the novel features of the invention.

Referring to the drawings more in detail, numeral 1 indicates the sidewalls of a conveyer frame, carrying a continuously moving endless conveyer belt 2. This conveyer belt, which is driven by any desired mechanism, receives the formed or partly formed caps and carries them through the several devices adapted to arrange them in the manner desired. As will be apparent from the further description of this invention, it is of general application wherever it is desired to arrange blanks, completed caps, or similar articles, in mouth-up or mouth-down position; and it is particularly useful for receiving the blanks from a stamping press, and arranging them for feeding to a threading machine, or for receiving blanks or formed caps from a bin or hopper and delivering them, properly arranged, to a table for hand operation such as sorting, assembling, etc. It is needless to attempt to mention here the many useful purposes for which this invention may be advantageously employed.

Figure 2:
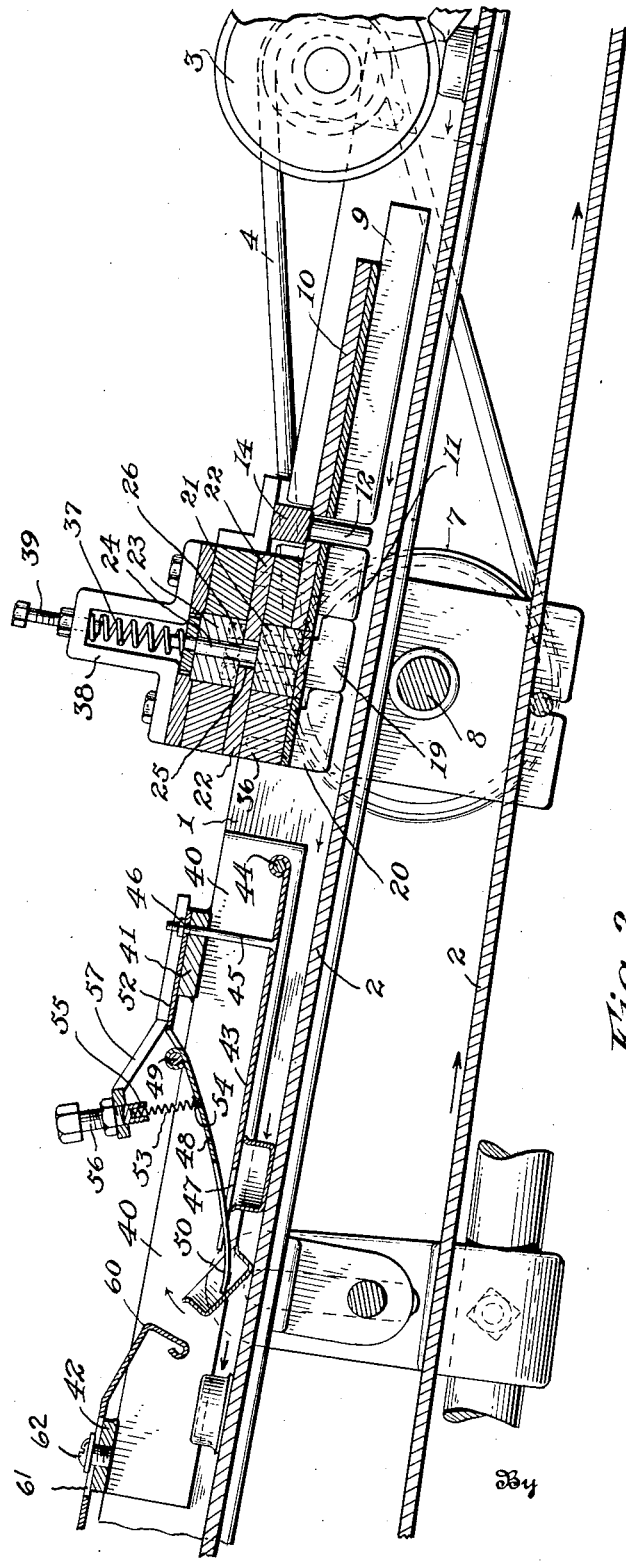
Figure 2 is a vertical longitudinal sectional view of the spacing unit and turn-over unit.

When the caps or blanks, hereinafter referred to as caps, reach the conveyer, some of them are mouth-down, some mouth-up, some will be riding on others as illustrated at the right-hand end of Figure 2, while others will be standing on their rims or skirts. The first step is to level the caps off, so that they will all be flat on the conveyer belt, either mouth-up or mouth-down.

For this purpose there is provided a felt covered roller 3, suitably mounted in a frame attached to the conveyer frame. The roller is continuously driven by any desired mechanism, as by a belt 4 passing over a pulley 5 of the roller shaft 6; the belt being driven by a pulley 7 attached to the cam shaft 8 of the spacing unit, to be hereinafter described. The bottom of the roller travels in a direction opposite to the direction of travel of the upper flight of the endless conveyer belt, and is at such a distance above the belt that it will prevent the passage of any caps standing on their edges, or on top of each other. When the caps pass under the roller they are leveled off, so that all of them are flat on the conveyer belt, either mouth-up or mouth-down, as they are carried forward to the spacing unit, which will now be described.

Just after the caps have passed beneath the roller, they are arranged in single files or columns by means of stationary guide ribs 9, between which the caps pass; the ribs being spaced a distance somewhat greater than the diameter of the caps, but in any event the distance between the ribs being not sufficient to permit two caps to enter abreast. Any desired number of these guide ribs may be employed; depending upon the desired capacity of the machine. In the particular machine illustrated herein, there are six of the guide ribs 9, forming five of the passages 9', through which the caps pass in single file. The guide ribs may be mounted in any desired manner, as by screwing or welding them to a plate 10 which is preferably carried by the conveyer frame; the lower edges of the guide ribs being slightly spaced above the conveyer belt 2, as illustrated in Fig. 2.

Figure 4:
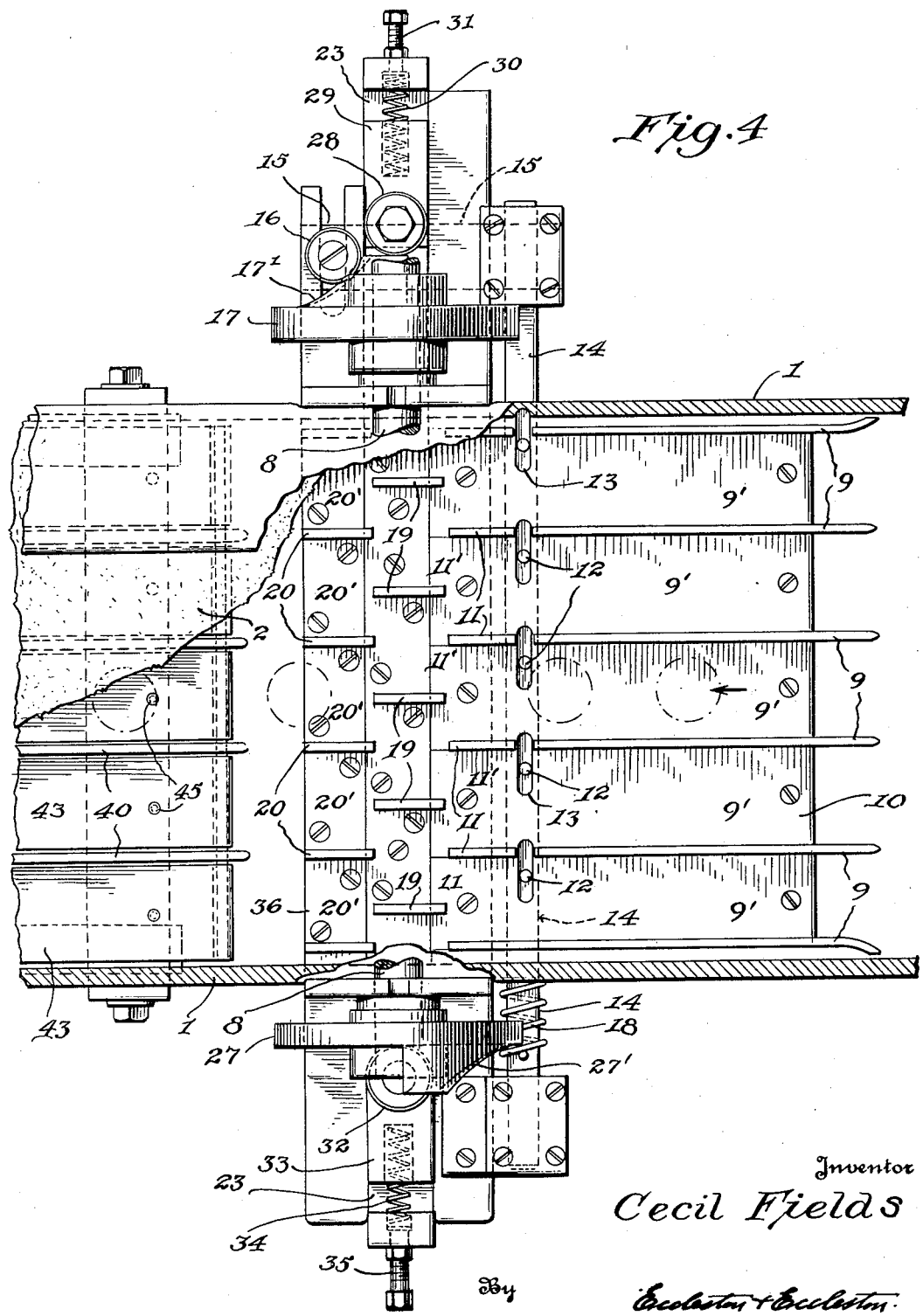

Spaced slightly forward from the forward ends of the ribs 9, and in alignment therewith, is another series of ribs 11; and arranged in the space between the adjacent ends of the ribs 9 and 11, and adapted to reciprocate transversely of the conveyer, is a series of obstruction pins 12, which project downwardly through transversely extending slots 13 formed in the plate 10. When these pins are in or near the center of the passages 9', they function as stops or baffles to prevent the forward movement of the columns of caps in the passages; so that the foremost cap in each column comes to rest against one of these pins. Of course the foremost cap of each column is permitted to pass on when the pins are shifted transversely of the conveyor to a position between the adjacent ends of ribs 9 and 11. In Figure 4 the pins are shown as having been moved part way from their central or obstructing position to their inactive position.

Any desired mechanism may be employed for shifting the pins back and forth between active and inactive positions; though it is preferable that they be moved slowly to their inactive or open position, and then rapidly to their active or close position. The preferred mechanism for reciprocating the pins, as illustrated herein, will now be described.

The pins 12 are attached to a rod 14, suitably mounted for sliding movement across the top of plate 10; the pins projecting downwardly through the above-mentioned slots 13 and terminating slightly above the conveyer belt. A plate 15 has one of its ends secured to one end of the rod 14, and the opposite end of the plate carries a roller 16 adapted to cooperate with a cam lobe 17' of the cam 17. This cam is fixed to the cam shaft 8; the shaft being driven by a belt (not shown) passing over a pulley 17'' fixed to the shaft. Of course the belt may be driven by any desired means, but it is preferred that the belt be driven from the same drive shaft (not shown) that drives the endless conveyer; so that the entire mechanism is operated from the same source; it having been previously described how the cam shaft 8 drives the shaft 6 for rotating the felt roller 3.

When the continued rotation of the cam 17 brings the cam lobe 17' into engagement with the roller 16, the rod 14 will be gradually withdrawn thereby carrying the pins to their inoperative or open position. In this position the pins permit a single cap in each passage 9' to move forwardly; and just as these caps have passed the pins the roller 16 rides off the cam lobe 17, thereby permitting a spring 18, mounted on the opposite end of the rod 14, to snap the rod and the fingers 12 back to their operative position, thus preventing the advancement of any more caps. The series of pins will remain in this position until the continued rotation of the cam shaft again brings the cam lobe 17' into engagement with the roller 16. The rod 14 and the series of pins carried thereby form what may be termed a preliminary gate.

The caps, after passing the preliminary gate, enter the passages 11' formed between the guide ribs 11, and are retained therein by means of locking guide ribs 19, which form the final gate. These ribs 19 perform the double function of locking the caps in the passages 11' for a period, and then when moved transversely of the conveyer, guiding the caps forwardly into passages 20' formed by guide ribs 20.

The locking guide ribs 19 are carried by a bar 21 extending transversely of the conveyer belt, and mounted in any desired manner for sliding movement. In the particular form illustrated the bar 21 is arranged below a plate 22 which is attached to the conveyer frame, and arranged above the plate is another bar 23 united with bar 21 by means of a pin 24; the pin passing through an appropriate slot 25 in the plate. To facilitate the reciprocation of the bars 21, 23, which together with the locking guide ribs 19 constitute the final gate, they are preferably mounted upon ball bearings 26.

It will be apparent that many different mechanisms could be employed for reciprocating the final gate at the desired times, but the preferred mechanism, as illustrated herein, comprises the hereinafter mentioned cam 17 having a cam lobe 17', and a cam 27 having a cam lobe 27'; both of these cams being mounted on the cam shaft 8.

Cam lobe 17' cooperates with roller 28, which preferably is not mounted directly on the bar 23, but upon a block 29 which is slidably mounted upon the bar 23 in any desired manner, as in a dovetail groove (not shown). The block is normally held at the inner end of the slot by means of a spring 30, the tension of which may be adjusted by a screw 31. Of course this particular arrangement is merely a safety device to prevent any jamming or breakage of parts in case caps should be caught between the moving and stationary ribs.

In the same manner, the cam lobe 27' cooperates with a roller 32 carried by a block 33 slidably mounted adjacent the opposite end of the bar 23; the block being normally held in its inner position by a spring 34 which may be adjusted by a screw 35.

By reference to Figure 4, it will be seen that the cam lobe 17' has cooperated with roller 28 to its full extent, thereby moving the locking guide ribs 19 of the final gate to the limit of their movement to the right; in which position the gate locks the caps in the passages 11'. The further continued rotation of the cam shaft causes the roller 28 to ride free of the cam lobe 17', and the gate therefore remains in the position shown in Figure 4 until cam lobe 27' engages the roller 32 and moves the final gate to the left or open position, in which position the caps are free to be carried forward into the passages 20' formed by the previously mentioned stationary guide ribs 20 mounted upon a bar or plate 36.

It will be noted from the above description that after the roller 28 rides free of the cam lobe 17', the final gate is free so that it could be jarred or otherwise accidentally moved to the left. And likewise after the roller 32 rides free of the cam lobe 27' the gate is free, so that it could be jarred or otherwise accidentally moved to the right. For the purpose of preventing any accidental movement of this gate a spring 37 is mounted in a bracket 38, the lower end of the spring engaging over the upper end of the pin 24, and the spring being adjusted by a screw 39, as illustrated in Figure 2. Thus when the gate is moved to the right the lower end of the spring will be moved likewise, thereby canting the spring so that it will exert a pressure to maintain the gate in that position. And in the same manner when the gate is moved to the left the spring will be canted to the left and thereby exert its pressure to the left to maintain the gate at the left hand limit of its movement.

Figure 3:
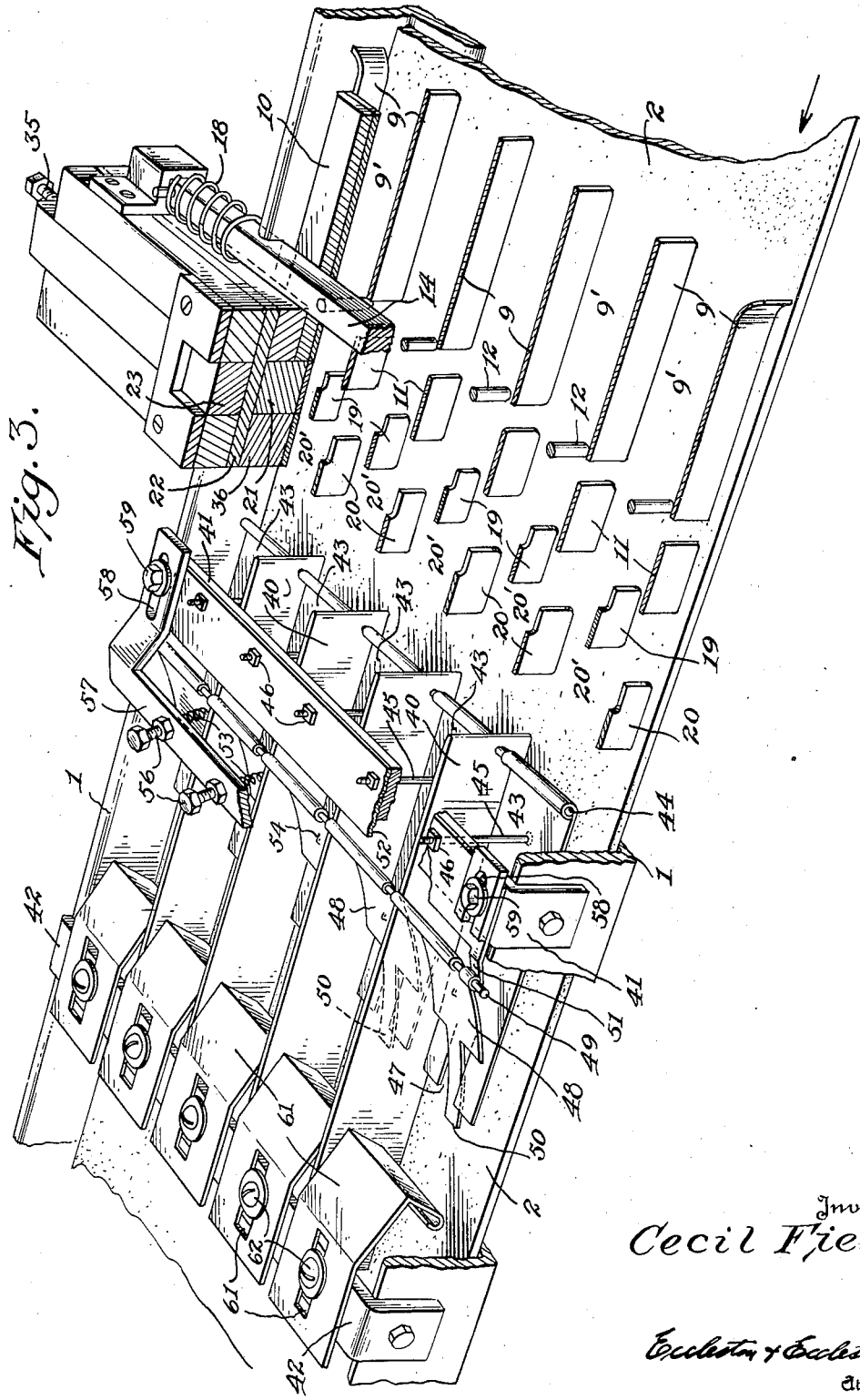
Figure 3 is a diagrammatic view of the spacing unit and turn-over unit; parts being broken away, and parts being omitted, for the sake of clearness; and, Figure 4 is a view, taken from below and looking upward, of the spacing unit and its operating mechanism; the endless conveyer which carries the caps, being omitted.

A brief general description of the operation of the spacing unit, will now be given, reference being had particularly to Figures 3 and 4. Let it be assumed that the device is just starting in operation, that the preliminary gate is in its locking position, with the pins substantially central of the passages 9' and that the several columns of caps have advanced until the forward cap of each column has come to rest against its particular locking pin. The cam lobe 17' will now engage roller 28 and move the final gate to the right (Fig. 4) thereby bringing the locking guide ribs into the position shown in Figure 4. Shortly after the cam lobe 17' engages roller 28 it engages roller 16 and moves the preliminary gate to the right (Fig. 4). This movement of the locking pins to their inoperative position permits the leading caps of each column to pass onward into the passages 11' where they are locked by means of the ribs 19 of the final gate; and just after these caps have passed the pins, the roller 16 rides free of the cam and the spring 18 snaps the preliminary gate back into locking position. Shortly thereafter the cam lobe 27' engages roller 32 and moves locking guide ribs 19 to the left (Fig. 4), thereby clearing the passages and permitting the caps to pass onwardly between these ribs, then between the ribs 20, and thence to the turn-over unit, to be presently described. The continued rotation of the cam shaft then brings the cam lobe into engagement with the roller 28 to again move the final gate to locking position, followed by the same cam then again engaging roller 16 to move the preliminary gate to its inoperative position, and so on through another cycle. In the manner above described the caps are properly spaced and are ready for the turn-over unit.

The turn-over unit which is just forward of the spacing unit, will now be described. After the caps pass through the spacing unit they are carried forward between guide ribs 40, which may be mounted in any desired manner, as by welding or otherwise attaching them to plates 41 and 42 secured to the conveyer frame. These ribs are, of course, slightly spaced above the conveyer belt, as illustrated in Figure 2.

As the caps pass between the guide ribs 40, they pass under the leaves 43 which have their rear ends hinged upon a pin 44 extending through the several guide ribs. These leaves are spaced above the conveyer belt just the height of the caps being treated, or slightly less than such height, so as to lightly press the caps against the face of the conveyer; and are adjustably maintained at the desired level by means of rods 45 which project upwardly from the leaves through the plate 41 and have nuts 46 threaded on their upper ends. The forward ends of these leaves 43 are forked to form centrally arranged open ended slots 47.

Numeral 48 refers to the cap turn-over elements which are loosely hinged upon a hinge pin 49; the free ends of these elements having turn-over fingers 50 which pass through the open ended slots 47 of the leaves 43 and rest lightly upon the conveyer belt. The hinge pin 49 may be mounted in any desired manner, as by knuckles 51 carried by a plate 52 attached to the plate 41.

The turn-over fingers 50 are pressed lightly against the conveyer belt by springs 53, the lower ends of which springs rest upon the turn-over elements 48, being centered by pins 54, or the like. The upper ends of the springs are received in sockets 55 formed in the lower ends of screws 56 threaded through a yoke 57 adjustably mounted on the plate 41 by slot and bolt connections 58, 59. Obviously, by adjusting the screws 56 the desired pressure will be exerted on the turn-over fingers 50.

In alignment with, and just forwardly of, the turn-over fingers, are baffle clips 60. These baffles are so shaped and so positioned that they insure the turning over of the caps after they have been tilted by the fingers 50, as will be described hereinafter. These baffle clips are preferably mounted on the plate 42, and are rendered adjustable for different sizes of caps by means of the slot and screw connections 61, 62.

The operation of the turn-over unit will now be briefly described. When the caps reach the turn-over unit, after passing through the spacing unit, they are properly spaced, and they are all flat upon the conveyer belt, but some of them are in mouth-up position while others are in mouth-down position. The function of the turn-over unit is to arrange all of them in mouth-down position.

The caps which are already in mouth-down position will pass under the leaves 43, and then under the turn-over fingers 50, without being affected in any way; so that when they leave the turn-over unit they will be in exactly the same position on the conveyer as when they entered it. The caps which are in mouth-up position will likewise pass under the leaves 43, but when they reach the forward end of these leaves the turn-over fingers will ride over the forward flange of the caps and then snap down into the interior of the caps, whereby the caps are tilted up in the manner illustrated in Figure 2. The portion of the cap resting on the conveyer is carried forward so that the cap finally capsizes to mouth-down position. In the event that the cap has not fallen over into mouth-down position before it reaches the baffle 60, it will strike the latter and be positively pushed over. Thus every cap which is in mouth-up position when it enters the turn-over unit, will be in mouth-down position when it passes free of such unit. It should be mentioned that the main function of the leaves 43 is to prevent the caps from tilting up in the wrong direction (i. e. the opposite direction to that shown in Fig. 2) when they reach the turn-over fingers 50; in which position they might not get enough traction from the conveyer to pull them under the turn-over fingers. By the arrangement illustrated the leaves 43 maintain the caps flat on the conveyer until the turn-over finger rides up over the forward flange of the cap.

All of the caps are now in mouth-down position and the conveyer belt carries them forward to the point of disposal. They may be removed from the belt in any desired manner. In the form illustrated a curved guide arm 63 wipes the caps from the conveyer belt into a chute or runway 64 leading to a threading machine, or to any other position where the blanks or caps are to be further treated, or sorted, or packed, etc. As stated above, all of the caps are now in mouth-down position, but if it should be desired to arrange them all in mouth-up position it is only necessary to provide the proper turn in the chute or runway, so that the position of all of the caps as they pass out of the chute will be in reversed position.

It is apparent that the invention is subject to many modifications, all of which are intended to be included within the scope of the appended claims. The term "caps" as employed in the claims is intended to include completed caps, blanks for caps, and all similar articles.

What I claim is:

1. An apparatus for feeding caps, including a conveyer adapted to receive caps indiscriminately placed thereon, and means associated with the conveyer entering the caps which are in mouth-up position for capsizing such caps, said means permitting caps in mouth-down position to pass thereunder without being disturbed.

2. An apparatus for feeding caps, including a conveyer adapted to receive caps indiscriminately placed thereon, a finger lightly resting on the conveyer, said finger adapted to enter the interior of caps in mouth-up position and invert them.

3. An apparatus for feeding caps, including a conveyer adapted to receive caps indiscriminately placed thereon, a finger hinged at one end above the conveyer and having its opposite end resting on the conveyer, the caps being carried under the finger by the conveyer, and the finger adapted to enter the interior of caps in mouth-up position and invert them.

4. An apparatus for feeding caps, including a conveyer adapted to receive caps indiscriminately placed thereon, a finger arranged above the conveyer and having one end resting thereon, a spring pressing the finger lightly against the conveyer, and means for guiding the caps under the finger, the caps in mouth-down position passing under the finger undisturbed, and the caps in mouth-up position being inverted by the finger.

5. An apparatus for feeding caps, including a conveyer, and a turn-over unit, said unit comprising a finger adapted to engage the interior of caps in mouth-up position to tilt them up on their rims, and a baffle for pushing them over into mouth-down position.

6. An apparatus for feeding caps, including a conveyer and a turn-over unit, said unit comprising a finger so mounted that one end rests lightly on the conveyer, and a baffle arranged over the conveyer and forward of said finger, for the purpose described.

7. An apparatus for feeding caps, including a conveyer and a turn-over unit, said unit comprising a finger so mounted that one end rests lightly on the conveyer, a baffle arranged over the conveyer and forward of said finger, and means for adjusting the baffle toward or from the finger.

8. An apparatus for feeding caps, including a conveyer, and a turn-over unit, said unit including a leaf for holding the caps down on the conveyer, and a turn-over finger for engaging the interior of the caps in mouth-up position before they are free of said leaf.

9. An apparatus for feeding caps, including a conveyer and a turn-over unit, said unit including a leaf for holding the caps down on the conveyer, and a turn-over finger resting lightly on the conveyer beyond said leaf, for the purpose specified.

10. An apparatus for feeding caps, including a conveyer and a turn-over unit, said unit comprising a leaf for holding the caps down on the conveyer, the forward end of said leaf having a slot, and a turn-over finger passing through said slot and engaging the interior of caps in mouth-up position before they are free of said leaf.

11. An apparatus for feeding caps, including a conveyer and a turn-over unit, said unit comprising a pivotally mounted leaf, means for vertically adjusting the leaf, said leaf having a slot in its forward end, a pivotally mounted turn-over finger, the forward end of said finger passing through said slot and resting on the conveyer and a spring engaging the finger and pressing it lightly against the conveyer.

12. An apparatus for feeding caps, including a conveyer and a turn-over unit, said unit comprising a leaf for holding the caps down on the conveyer, a turn-over finger for engaging the interior of caps in mouth-up position to tilt them, and a baffle for engaging the caps after they have been tilted.

13. An apparatus for feeding caps, including a conveyer adapted to receive caps placed indiscriminately thereon, means for tilting the caps that are in mouth-up position, and means for engaging and pushing over the caps after they have been tilted and while they are being carried forward on the said conveyer in the same horizontal plane.

14. An apparatus for feeding caps, including a conveyer adapted to receive caps placed indiscriminately thereon, means for tilting the caps that are in mouth-up position, and a baffle arranged at such height as to engage tilted caps while they are being carried forward on the said conveyer in the same horizontal plane but to permit untilted caps to pass freely thereunder.

15. An apparatus for feeding caps, including a conveyer adapted to receive caps indiscriminately placed thereon, a plurality of guides between which the caps pass in columns, a leaf arranged between each pair of guides and holding the caps down on the conveyer, a turn-over finger associated with each leaf and resting lightly on the conveyer, and a baffle arranged between each pair of guides beyond said finger.

16. An apparatus for feeding caps, including a conveyer adapted to receive caps indiscriminately placed thereon, a roller for leveling the caps flat on the conveyer in mouth-up or mouth-down position, and means entering and inverting the caps which are in mouth-up position.

17. An apparatus for feeding caps, including a conveyer adapted to receive caps indiscriminately placed thereon, a roller for leveling the caps flat on the conveyer in mouth-up or mouth-down position, means for spacing the caps, and means for inverting the caps which are in mouth-up position, the caps after being inverted remaining on said conveyer in the same horizontal plane at the point of inversion.

18. An apparatus for feeding caps, including a conveyer adapted to receive caps indiscriminately placed thereon, guide ribs forming the caps into one or more columns, means permitting the forward movement of caps one by one, and means for inverting the caps which are in mouth-up position, the caps after being inverted remaining on said conveyer in the same horizontal plane at the point of inversion.

19. An apparatus for feeding caps, including a conveyer adapted to receive caps indiscriminately placed thereon, means for spacing said caps and permitting the forward movement thereof one by one, and means for inverting the caps which are in mouth-up position, the caps after being inverted remaining on said conveyer in the same horizontal plane at the point of inversion.

20. An apparatus for feeding caps, including a conveyer adapted to receive caps indiscriminately placed thereon, a preliminary gate temporarily obstructing the passage of caps, a final gate temporarily obstructing the passage of caps after they have passed the preliminary gate, and a turn-over finger mounted over the conveyer beyond the final gate and adapted to engage the interior of caps in mouth-up position and invert them.

21. An apparatus for feeding caps, including a conveyer adapted to receive caps indiscriminately placed thereon, means for leveling the caps off flat on the conveyer in mouth-down position, a plurality of guide ribs for forming the caps into a plurality of columns, a preliminary gate temporarily obstructing the passage of the caps, means for operating the gate to permit the passage of the leading cap of each column, a final gate temporarily obstructing the further passage of the caps which have passed the preliminary gate, means for operating the final gate to permit the forward passage of such caps, a plurality of leaves for holding the caps down on the conveyer, a turn-over finger associated with each leaf to tilt the caps which are in mouth-up position, and a baffle for engaging the tilted caps.

CECIL FIELDS.